UNITED STATES PATENT OFFICE.

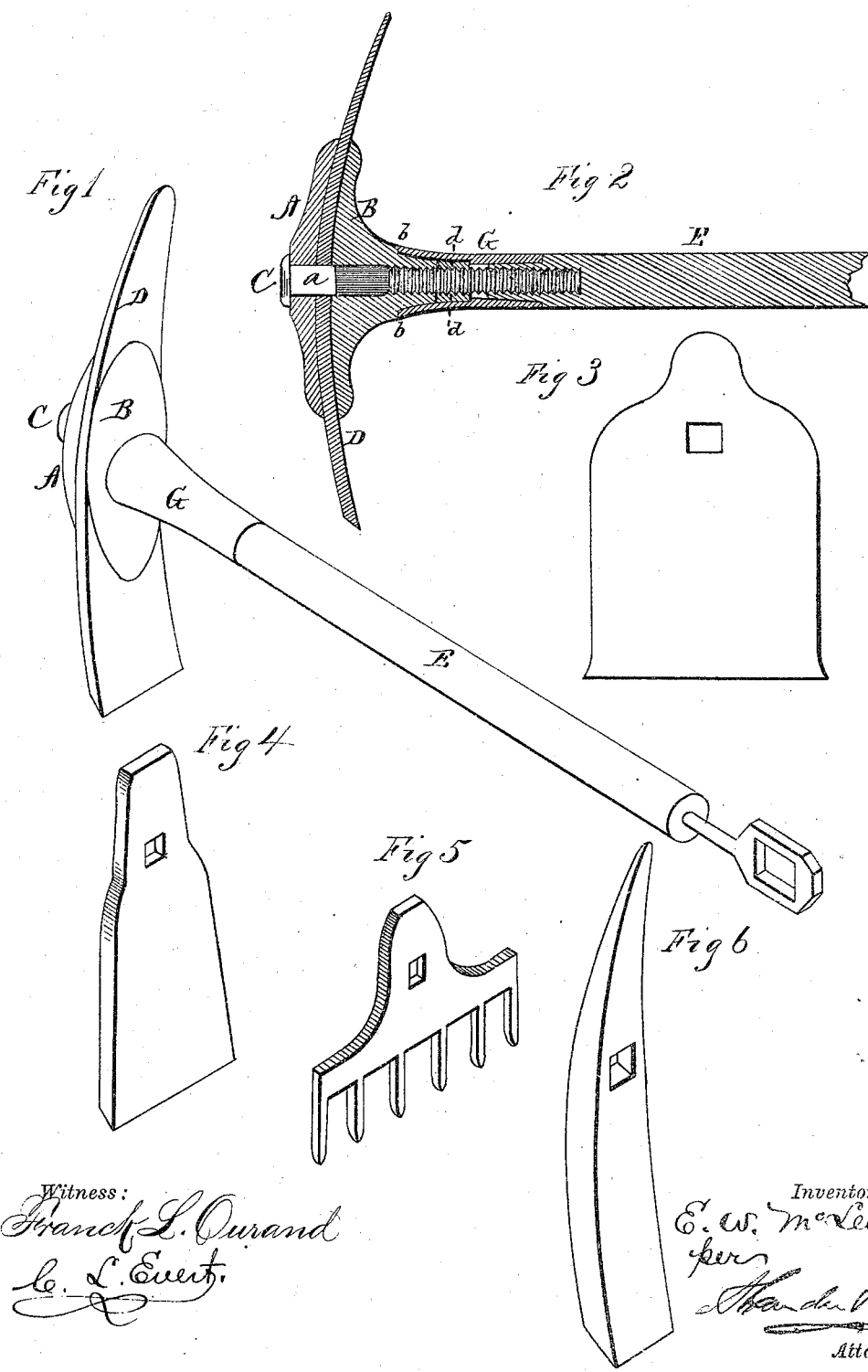

ELIJAH W. McLENDON, OF GRIFFIN, GEORGIA.

IMPROVEMENT IN HOES.

Specification forming part of Letters Patent No. 140,291, dated June 24, 1873; application filed December 12, 1872.

*To all whom it may concern:*

Be it known that I, ELIJAH W. MCLENDON, of Griffin, in the county of Spalding and in the State of Georgia, have invented certain new and useful Improvements in Hoes; and do hereby declare that the following is a full, clear, and exact description thereof, reference being had to the accompanying drawings and to the letters of reference marked thereon, making a part of this specification.

My invention is intended as an improvement upon the patent granted to W. M. McLendon for hoes on the 14th of March, 1872; and consists in clamping the implement blade between two jaws, by a nut screwed upon the screw-bolt which passes through the parts, the end of said screw being afterward screwed into the handle, and the connecting-parts covered by a thimble arranged between the inner jaw and handle, all as more fully hereinafter set forth.

In order to enable others skilled in the art to which my invention appertains to make and use the same, I will now proceed to describe its construction and operation, referring to the annexed drawing, in which—

Figure 1 is a perspective view, and Fig 2 a longitudinal section, of my tool-handle. Figs. 3, 4, 5, and 6 represent various implements to be held in said handle.

A and B represent two jaws, between which the implement is clamped, a bolt, C, passing through the center of the same. The part $a$ of this bolt, nearest to the head, is square for a suitable distance, so that the outer jaw A and the implement D may be placed upon said portion $a$, and be prevented from turning on the same, the holes in said jaw and implement being made square for this purpose. The balance of the bolt is made round, as usual. The inner jaw B is then put on, and the whole fastened together by a nut, $d$, screwed down tightly on the bolt C. E represents the handle, upon the end of which is a flaring socket, G. The end of bolt C is passed through this socket and screwed into the end of the handle E. When screwed up tight the flaring end of the socket G will cover the nut $d$, and extend up to a shoulder, $b$, on the jaw B, thus inclosing the entire joint.

Any kind of implement may be used with this handle, the only requisite being that the implement should have a tongue or similar part to go between the jaws A B, and said part be provided with a square hole for the part $a$ of the bolt C.

Having thus fully described my invention, what I claim as new, and desire to secure by Letters Patent, is—

The combination of the jaws A B, screw-bolt C, and nut $d$, for clamping the implement blade, with the handle E, and thimble G, all the parts being constructed, substantially as set forth.

In testimony that I claim the foregoing I have hereunto set my hand this 25th day of November, 1872.

ELIJAH W. McLENDON.

Witnesses:
 A. J. MADDOX,
 WM. H. HARTNETT.